United States Patent [19]
Dobbs

[11] Patent Number: 4,690,085
[45] Date of Patent: Sep. 1, 1987

[54] PROPULSION SYSTEM FOR A TORPEDO WITH THRUST COMPENSATION

[75] Inventor: Daniel R. Dobbs, Rockford, Ill.

[73] Assignee: Sundstrand Corporation, Rockford, Ill.

[21] Appl. No.: 883,634

[22] Filed: Jul. 9, 1986

[51] Int. Cl.⁴ .......................... F16C 35/06; F16C 33/74
[52] U.S. Cl. ....................................... 114/20.2; 384/99; 440/83
[58] Field of Search ...................... 114/20.2, 20.1, 338; 384/99; 440/83

[56] References Cited

U.S. PATENT DOCUMENTS

| | | | |
|---|---|---|---|
| 3,301,210 | 1/1967 | Oeland, Jr. ........................ | 114/20.1 |
| 3,361,498 | 1/1968 | Cook .................................. | 384/536 |
| 3,496,793 | 2/1970 | Daugherty ....................... | 114/338 X |
| 3,558,199 | 1/1971 | Raiser et al. ..................... | 384/556 |
| 3,620,586 | 11/1971 | Maastricht ....................... | 384/563 X |
| 3,686,986 | 8/1972 | Ledergerber et al. ........... | 384/563 X |
| 3,866,988 | 2/1975 | Striegler .......................... | 384/479 X |
| 3,911,756 | 10/1975 | Colinet ............................. | 74/410 |
| 3,943,803 | 3/1976 | Hafla ................................ | 384/563 |
| 4,033,645 | 7/1977 | Yamada ............................ | 384/563 |
| 4,084,861 | 4/1978 | Greenberg et al. ............. | 384/99 |
| 4,333,692 | 6/1982 | Kraus ............................... | 384/103 |
| 4,391,474 | 7/1983 | Martini ............................. | 114/23 X |
| 4,551,032 | 11/1985 | Mottershead .................... | 384/517 |
| 4,626,111 | 12/1986 | Swasey et al. ................... | 384/99 |

Primary Examiner—David H. Brown
Attorney, Agent, or Firm—Wood, Dalton, Phillips, Mason & Rowe

[57] ABSTRACT

The size of a bearing 34 required to journal a propeller 16 may be reduced by mounting the bearing 34 on a piston 44 received in a cylinder 46 and by locating a piston 62 in a groove 52 on the hub 18 of the propeller 16. The groove 52 acts as a second cylinder and opens oppositely of the cylinder 46. The two are interconnected by bores and ports 64, 66, 68, 70 and filled with an incompressible fluid.

10 Claims, 3 Drawing Figures

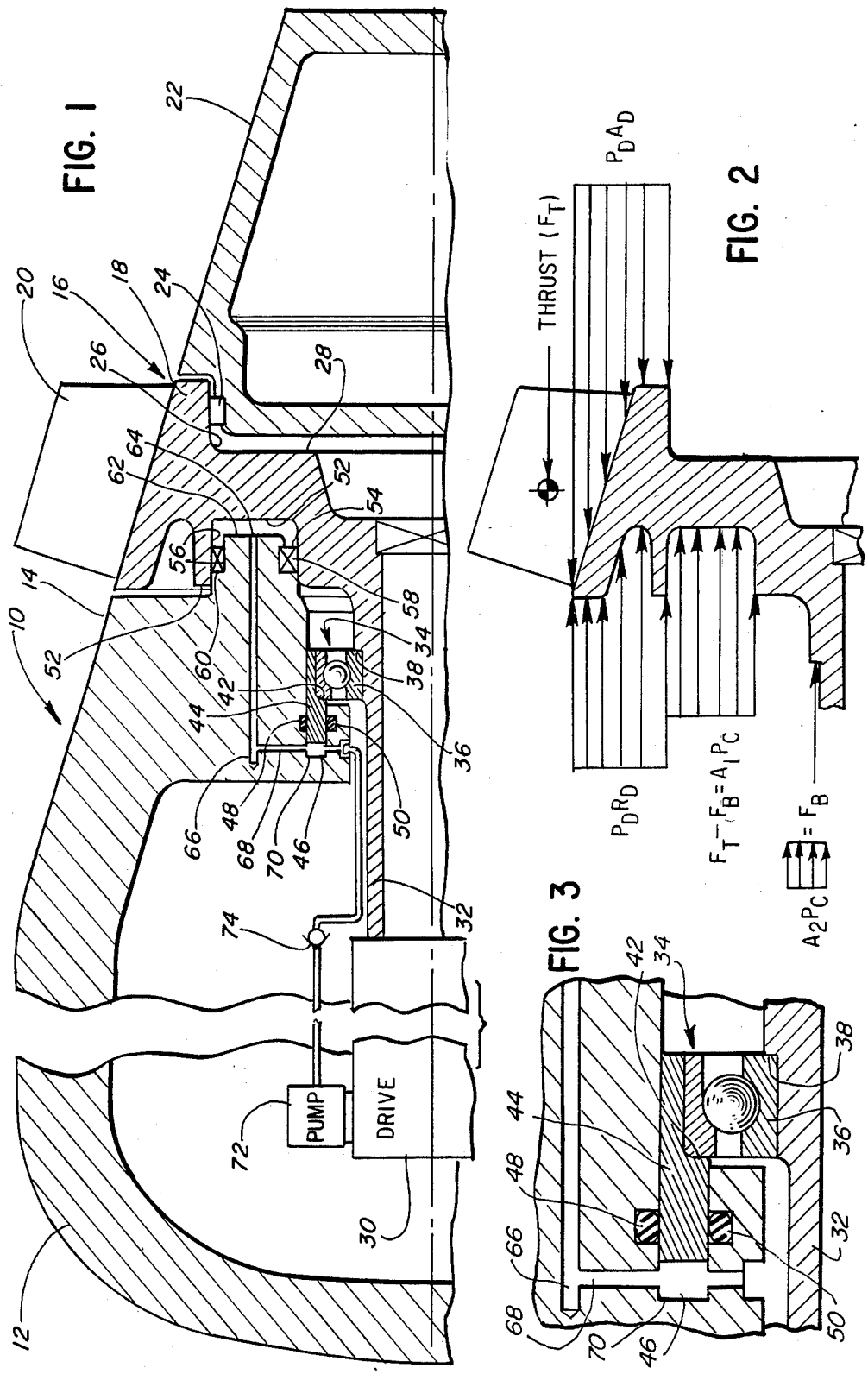

PROPULSION SYSTEM FOR A TORPEDO WITH THRUST COMPENSATION

FIELD OF THE INVENTION

This invention relates to torpedo propulsion systems, and more specifically, to one wherein the bearing journalling the propeller may be of minimum size.

BACKGROUND OF THE INVENTION

The propeller of a torpedo is subjected to axial thrust loads due to water pressure and the thrust load generated by its own rotation. Most typically, this thrust load is reacted through a bearing to the hull structure. Consequently, the bearing must be of sufficient size to transmit the entirety of the thrust loading. The use of a large bearing is costly and undesirable from that standpoint.

Furthermore, the bearing may provide a path for the transmission of noise from the propeller via the hull structure to the water in which the torpedo was running. Such noise is obviously undesirable in that it facilitates in detection of the torpedo. It is thought that the degree of noise transmission from the propeller to the water via the hull may be reduced by some degree by reducing the thrust load on the bearing.

The present invention is directed to overcoming one or more of the above problems.

SUMMARY OF THE INVENTION

It is the principal object of the invention to provide a new and improved propulsion system as may be used, for example, in a torpedo. More specifically, it is an object of the invention to provide such a system wherein the size of the bearing journalling a propeller may be minimized.

An exemplary embodiment of the invention achieves the foregoing object in a structure including a frame, a rotatable propeller on the frame, a drive on the frame connected to the propeller, and a bearing journalling the propeller for rotation about an axis. A first piston mounts the bearing on the frame for movement along the axis. A first cylinder receives the piston. A second piston is disposed on the frame and is received in a second cylinder on the propeller which opens oppositely of the first cylinder. Means place the cylinders in fluid communication with each other. As a consequence of this construction, the provision of an incompressible fluid in the cylinders provides for thrust load transmission via the incompressible fluid in the second cylinder directly from the propeller hub. Thus, a portion of the total thrust load is transmitted via a path independent of the bearing.

In a preferred embodiment, at least one of the pistons and its associated cylinder constitute an annular piston in an annular cylinder, both being disposed about the axis.

In a preferred embodiment, the first piston is movable relative to the frame and the second piston is affixed to the frame.

The invention contemplates that the propeller include a central hub and that the second cylinder be an axially opening, annular groove in the hub. The second piston comprises an axially extending annular ridge received in the groove and radially inner and outer seals seal the interface of the ridge and the groove.

In a highly preferred embodiment, the effective area of the first piston is small in comparison to the effective area of the second piston. As this ratio is lessened, the proportion of the thrust load borne by the bearing is reduced.

Other objects and advantages will become apparent from the following specification taken in connection with the accompanying drawings.

DESCRIPTION OF THE DRAWINGS

FIG. 1 is a somewhat schematic sectional view of a torpedo and propulsion system made according to the invention;

FIG. 2 is a free body diagram illustrating thrust forces operating in the system.

FIG. 3 is a view of part of the structure shown in FIG. 1 and on an enlarged scale.

DESCRIPTION OF THE PREFERRED EMBODIMENT

An exemplary embodiment of a torpedo embodying a propulsion system made according to the invention is illustrated in FIG. 1. While the invention is illustrated in the environment of a torpedo, it should be understood that the same may be utilized with efficacy in other propulsion systems employing a propeller.

The torpedo includes a hull, generally designated 10. The hull 10 has a forward end 12 as well as a rearward end 14. A propeller, generally designated 16, is disposed at the rearward end 14. The propeller includes a central hub 18 and a plurality of generally radially extending blades 20 (only one of which is shown).

A tail cone 22 is affixed to the hull 10 in any suitable fashion and is sealed against the propeller 16 by a seal 24 abutting the sidewall 26 of an axially opening, rearwardly facing recess 28 in the hub 18.

Within the hull 10 there is mounted a suitable drive 30 rotating a shaft 32 affixed to the hub 18.

A bearing, generally designated 34, journals the hub 18 and is seen to include an inner race 36 abutting a forwardly facing shoulder 38 on the hub 18. The bearing 34 also includes an outer race 40 which abuts a rearwardly facing shoulder 42 on an annular piston 44. The annular piston 44 is concentric with the axis of rotation of the shaft 32 and is received in an axially rearwardly opening groove 46. The piston 44 and groove 46 define an annular piston and cylinder arrangement and their respective sides are sealed by radially outer seals 48 and radially inner seals 50 carried by the part of the hull 10 in which the groove 46 is formed.

The forward side 52 of the hub 18 includes a forwardly axially opening annular groove 52. The groove 52 has sides 54 and 56 which are embraced by radially inner and radially outer seals 58 and 60 respectively carried on a rearwardly facing annular, axially extending projection or ridge 62. The ridge 62 defines a piston received within the groove 52 with the latter defining the cylinder.

A port 64 in the ridge 62 is in fluid communication with the groove 46 via a bore 66 and a bore 68 terminating in a port 70 within the groove 46. The grooves 46 and 52 as well as the bores 66 and 68 are adapted to be filled with an incompressible fluid. If desired, a pump 72 may be provided to drive an incompressible fluid, such as a hydraulic fluid, through a check valve 74 to the groove 46.

As a result of this construction, axial forces applied against the propeller 16, which will be in the forward direction, will tend to move the propeller 16 forwardly relative to the rest of the hull 10. This movement in turn will be conveyed to the inner race 36 of the bearing 34 and in turn to the outer race 40 and against the shoulder 42 of the piston 44. In other words, the force will tend to push the piston 44 more deeply into the groove 46. This will result in incompressible fluid in the groove 46 being expelled therefrom through the port 70 and the bores 68 and 66 to the groove 52. This flow of fluid in turn applies a balancing force tending to push the propeller 16 rearwardly thereby lightening the thrust load on the bearing 40.

It will be observed that the effective area of the piston and cylinder is defined by the groove 52 and the ridge 62 is large as regards the effective area of the piston 44.

In connection with this relation, attention is directed to FIG. 2. In FIG. 2, the total thrust load forwardly on the propeller is designated $F_t$. It will be noted that pressure and area forces acting against the radially outer section of the hub 18 are balanced by reason of the provision of the seals 56 with the same diameter as the seals 24. These forces are indicated as $P_d A_d$.

The reactive force transmitted to the propeller via the bearing 40 is shown at $F_b$ and it will be appreciated that the thrust being transmitted via the incompressible fluid within the groove 52 will be equal to the total thrust load $F_t$ less the bearing force, $F_b$. These forces can also be designated $A_1 P_c$ and $A_2 P_c$, respectively, where $A_1$ is the effective area of the piston 62 and $A_2$ is the effective area of the piston 44. At equilibrium, all forces will balance and it can thus be shown that the bearing load, $F_b$ is equal to the total thrust load $F_t$ divided by $(A_1/A_2+1)$.

It can be seen, therefore, that the greater the ratio of $A_1$ to $A_2$, the lesser the bearing load $F_b$.

Consequently, in making the effective area of the piston 62 large with respect to the effective area of the piston 44, the size of the bearing 34 required to accommodate the bearing load $F_b$ may be minimized.

In the usual situation, it is desirable to locate the groove 52 radially outwardly of the groove 46 since this allows the effective area of the groove 46 to be minimized while the effective area of the groove 52 is maximized.

I claim:

1. In a propulsion system, the combination of:
 a frame;
 a rotatable propeller on said frame;
 a drive on said frame and connected to said propeller;
 a bearing jurnalling said propeller for rotation about an axis;
 a first piston mounting said bearing on said frame for movement along said axis;
 a first cylinder on said frame receiving said piston;
 a second piston on said frame;
 a second cylinder on said propeller opening oppositely of said first cylinder and receiving said second piston; and
 means placing said cylinders in fluid communication with each other.

2. The propulsion system of claim 1 wherein the effective area of said first piston is small in comparison to the effective area of said second piston.

3. The propulsion system of claim 1 wherein said frame is the hull of a torpedo.

4. The propulsion system of claim 1 wherein at least one of said pistons and associated cylinder constitute an annular piston and cylinder and disposed about said axis.

5. The propulsion system of claim 4 wherein said first piston is movable relative to said frame and said second piston is affixed to said frame.

6. The propulsion system of claim 5 wherein said propeller includes a control hub and said second cylinder is an axially opening annular groove in said hub, said second piston comprising an axially extending annular ridge received in said groove and radially inner and outer seals sealing the interface of said ridge and said groove.

7. A thrust compensated journal for a torpedo propeller comprising:
 a propeller including a hub with radially directed blades extending therefrom, said hub having a forward side;
 an axially opening annular first groove in said forward side of said hub, said first groove having radially spaced sides;
 a torpedo hull having a forward end and a rearward end;
 an axially extending, rearwardly directed, annular projection on said hull and received in said first groove and having sides in sealing relation with the sides of said first groove;
 a port in said projection opening to said first groove;
 a rearwardly axially opening annular second groove in said hull forwardly of said hub;
 a port in said hull opening to said second groove;
 means, including a body of incompressible fluid, establishing communication between said ports;
 an annular piston in said second groove; and
 a bearing mounted on said piston and journalling said hub.

8. The journal of claim 7 wherein said second groove is radially inwardly of said first groove.

9. The journal of claim 7 wherein the effective area of said second groove is significantly less than that of said first groove, whereby the size of said bearing may be minimized.

10. The journal of claim 7 wherein said bearing has inner and outer races, said inner race abutting a forward facing shoulder on said hub and said outer face abutting a rearward facing shoulder on said piston.

* * * * *